United States Patent [19]

Nada et al.

[11] Patent Number: 4,751,096

[45] Date of Patent: Jun. 14, 1988

[54] FISH PRODUCT RESEMBLING CRAB MEAT

[75] Inventors: Minoru Nada; Masanobu Nakanishi, both of Himeji; Tetsuo Takiguchi, Onoda; Seiji Tsushima, Ube, all of Japan

[73] Assignee: Yamasa Kamaboko Kabushikikaisha, Himeji, Japan

[21] Appl. No.: 621,064

[22] Filed: Jun. 15, 1984

[30] Foreign Application Priority Data

Jun. 18, 1983 [JP] Japan ............................. 58-93889[U]
Oct. 19, 1983 [JP] Japan ................................. 58-196615

[51] Int. Cl.⁴ ............................................. A22C 25/20
[52] U.S. Cl. ..................................... 426/643; 426/104
[58] Field of Search ................ 426/643, 641, 274, 104

[56] References Cited

U.S. PATENT DOCUMENTS

| | | | |
|---|---|---|---|
| 2,938,803 | 5/1960 | Gorton | 426/643 |
| 3,532,512 | 10/1970 | Joaquin | 426/643 |
| 4,277,513 | 7/1981 | Rufer et al. | 426/643 |
| 4,396,634 | 8/1983 | Shenouda et al. | 426/643 |
| 4,439,456 | 3/1984 | Kammuri et al. | 426/643 |

OTHER PUBLICATIONS

Japanese Utility Model Publication 57-15670.

*Primary Examiner*—Raymond N. Jones
*Assistant Examiner*—Carolyn Paden
*Attorney, Agent, or Firm*—Finnegan, Henderson, Farabow, Garrett & Dunner

[57] ABSTRACT

A crab-meat-type fish paste product. The appearance of the product and the feel in the mouth, even with a fish paste, are very close to those of crab meat over prior art products. The product comprising a number of short cut fibrous fish meats which are disposed diagonally in a certain direction across the longitudinal direction of the finished product and the individual short fibrous meats are completely separated from one another.

6 Claims, 3 Drawing Sheets

FISH PRODUCT RESEMBLING CRAB MEAT

BACKGROUND OF THE INVENTION

(1) FIELD OF THE INVENTION

The present invention relates to a fish paste product, particularly to a boiled fish paste ("Kamaboko" in Japanese) which is similar to crab meat leg or claw meat in both appearance and its effect upon the palate.

(2) DESCRIPTION OF THE PRIOR ART

Fish paste products resembling crab meat have been developed in Japan because of the increased price of crab products that has accompanied slump of the northern-sea fishery in recent years, and because of the desirability for enlarged market of the fish paste products such as Kamaboko, etc. through a noble high value-added products. Nevertheless, it had to be admitted, that these finished products were far from actual crab leg meat since prior development of these products has been aimed primarily at obtaining similarlity in appearance only and facilitating the production process.

More specifically, as disclosed in Japanese Patent Publication No. 56-35143 and No. 56-38187, in the manufacture of the conventional crab-meat-type fish paste products, fibrous fish meat materials cut in the form of thin noodles are placed lengthwise, bundled together, and then cut crossways to obtain desired lengths. The resultant products are simple in structure with all the fibers arranged longitudinally. When consumed, the feel in one's mouth is similar to that of fibrous meats, but because of the long fibers, when chewed without severing them, the stringiness of the fibers makes the product unpleasant to eat. Neither is it possible to produce the texture of the actual crab leg meat, which consists of a combination of short fibers.

Further, if used unbound, because they are long fibers, they can not be directly used in vinegared side dishes or, salads unless cut up. There are also some products in which short fiber materials cut into thin fibers form a product wherein the fibers are arranged in random directions. Since their structure is such that the short fibers are combined in the various directions and states, when consumed they produce virtually none of the fibrous feel in the mouth of actual crab leg meat although they are crisp. And inasmuch as the product can not be used unbound, its use is limited.

The inventors have studied the above mentioned disadvantages of the conventional crab-meat-type fish paste products and, as a result, and proposed a product as disclosed in Japanese Utility Model Publication No. 57-15670. This was an attempt to obtain a completely novel fish paste product through attention to the fiber structure of the actual crab leg meat. In products of this type, however, the individual short fibrous meats are not completely separated but combined in part, and then bundled together in this interconnected state to form the product. The result is the same as if a number of lines had been cut into the product. Strictly speaking, the individual pieces of fish pastes are not in a short fiber state. When eaten the boiled fish meats must be torn up in the mouth. Where they are connected, the special feel is lost of crab meat which tears naturally along its fibers, its bundled fibrous meats gradually coming loose in the mouth.

It is therefore an object of the present invention to provide a crab-meat-type fish paste product with short fibers arranged diagonally in the longitudinal direction of the product, which possesses the appearance and fibrous feel of actual crab leg meat, tears easily in the direction of fibers when eaten as is, and can also be utilized in an unbound state, thereby increasing its practical applicability.

SUMMARY OF THE INVENTION

A crab-meat-type fish paste product according to the present invention comprises a number of short fibrous meats arranged diagonally across the longitudinal direction of the product. The individual short fibrous meats are completely independent of one another. Thus, even with a fish paste product such as a boiled fish paste (Kamaboko), it is capable of a taste extremely close to that of crab meat.

In another respect of the present invention, a finished product comprises a plurality of unit blocks having a number of short fiborous meats disposed diagonally across the longitudinal direction of the product, the direction of the fibers in respective unit blocks may be different if desired and the individual short fibrous meats included in the product are completely separated from one another.

In still another respect of the present invention, a crab-meat-type fish paste product comprises a number of short fibrous fish meats disposed parallel in a certain direction, across the longitudinal direction of the product and the individual short fibrous meats are completerly independent of one another, and the packed product of short fibrous meats are pressed to deform into an appearance similar to that of crab claw meat. Thus, according to the present invention, even with a fish paste product, it is capable of a feeling in the mouth and an appearance extremely close to those of crab claw meat.

An angle up to 90 degrees at maximum may be selected for disposing the short fibrous meats diagonally across the longitudinal direction of the product.

Preferably, the crab-meat-type fish paste product according to the present invention is packed into a film for sanitation, for easy handling, as well as for easy pressing to deform into the appearance similar to crab claw meat.

Also it is preferable to colour the crab-meat-type fish paste product according to the present invention, giving it a more close appearance to crab meat.

DESCRIPTION OF THE PREFERRED EMBODIMENTS

The present invention will be explained more in details with reference to the accompanying drawings.

Figure 1:
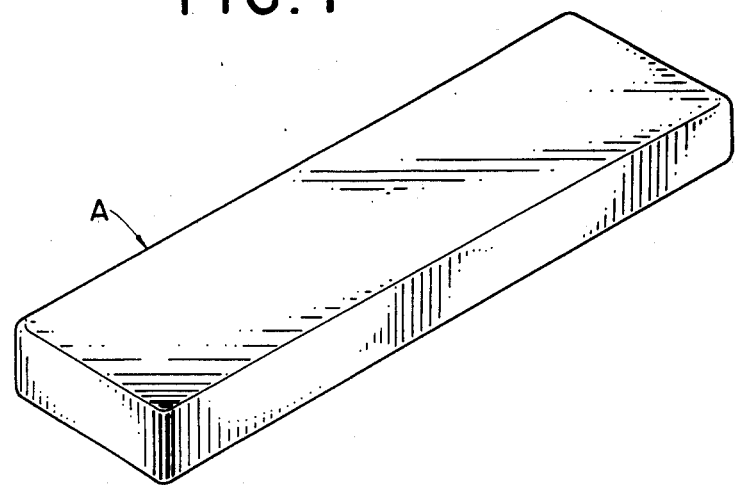
FIG. 1 is a perspective view of one embodiment of a crab-meat-type boiled fish paste product according to the present invention.
Figure 2:
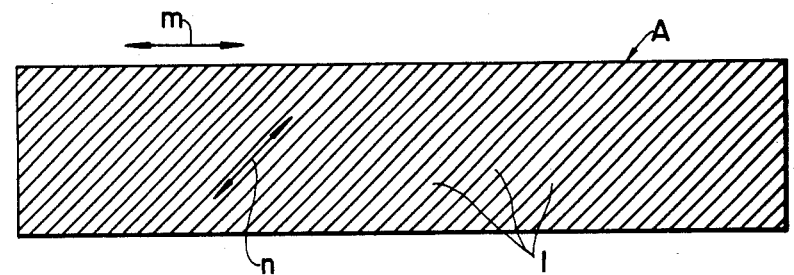
FIG. 2 is a sectional view of the product of FIG. 1.
Figure 3:
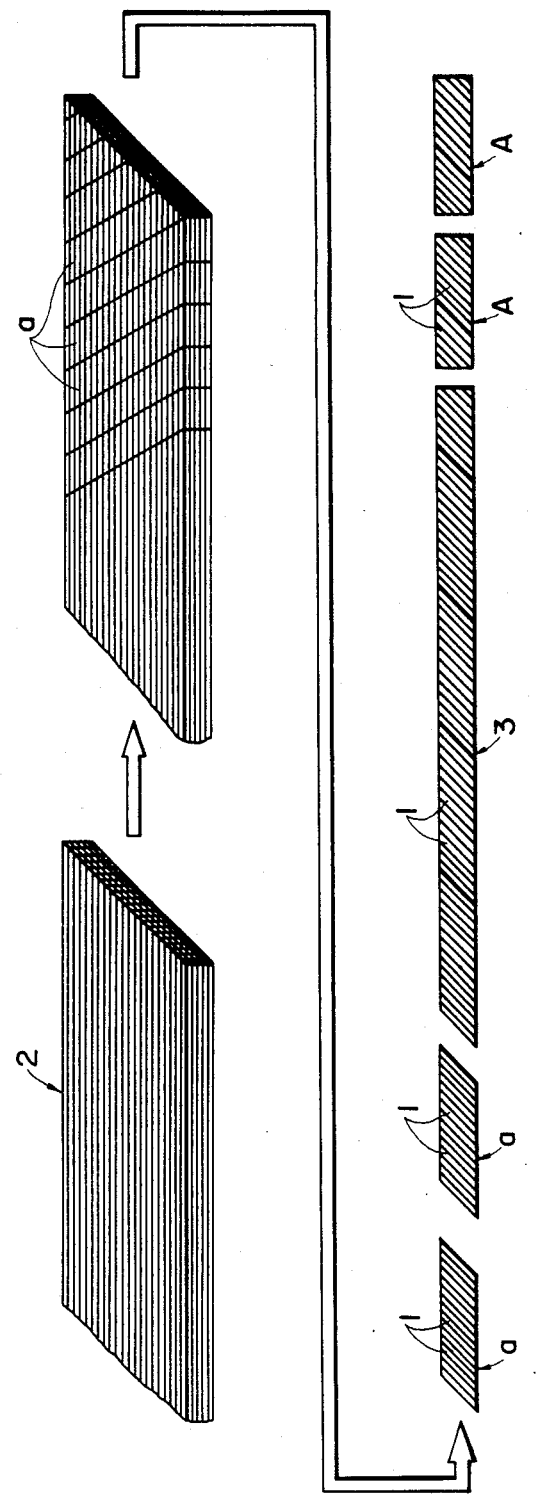
FIG. 3 is an explanatory view showing one example of the process for manufacturing the product of FIG. 1.

In FIGS. 1 through 3, A shows a finished product, a crab-meat-type boiled fish paste (Kamaboko) product according to the present invention. (referred to as "product" hereinafter)

In the product A, a number of short fibrous meats 1, 1 . . . made of boiled fish paste are bound in to an elongated product.

Those short fibrous meats 1, 1 . . . are not interconnected with each other but completely independent of one another. As seen from FIG. 2, the direction of fibrous meats (direction of an arrow n) is inclined at an angle of 45 degrees across the longitudinal direction (direction of an arrow m) of the product A.

FIG. 3 is an explanatory view showing one example of a process for manufacturing the product A. According to the process, fish paste as a raw material is first drawn out into a meat film under heating, thus manufacturing a plurality of thin meat film generally called as thin meat films. Then, these meat films are cut into a number of long fibrous materials completely independent of one another, and then the cut films are laminated into a group of long fibers 2. Preferably, a bonding agent such as an adhesive fish paste is added between the laminated meat films for providing sufficient interlayer adhesiveness. Subsequently, the grouped continuous long fibers 2 are cut at the angle of 45 degrees across the longitudinal direction of fibers, thereby to form a plurality of short fiber blocks a in which a number of short fibrous meats 1, 1 . . . are bound. Then, these short fiber blocks a, a, . . . are collected and disposed to form a long continuous block 3, thereby the cut faces of each block defining the lateral faces of the continuous long block. A plurality of short fiber blocks a are thus bonded and connected with each other in the longitudinal direction thereof so as to form a continuous long block 3. Then, the continuous long block 3 is cut into a plurality of the finished products A with any desired length.

In the finished product A thus manufactured, a number of short fibrous meats 1 are accumulated in such a way that those fibers 1 are disposed diagonally at 45 degrees with respect to the longitudinal direction of the product A and also completely independent of one another. Accordingly, when eaten, the product A is naturally torn up starting from the bitten part, along with fiber direction or the direction of the short fibrous meats 1, and the individual short fibrous meats 1 are gradually come loose in the mouth. As a result, feel in the mouth is very close to that of crab meat, particularly to the meat of crab claws.

Figure 6:
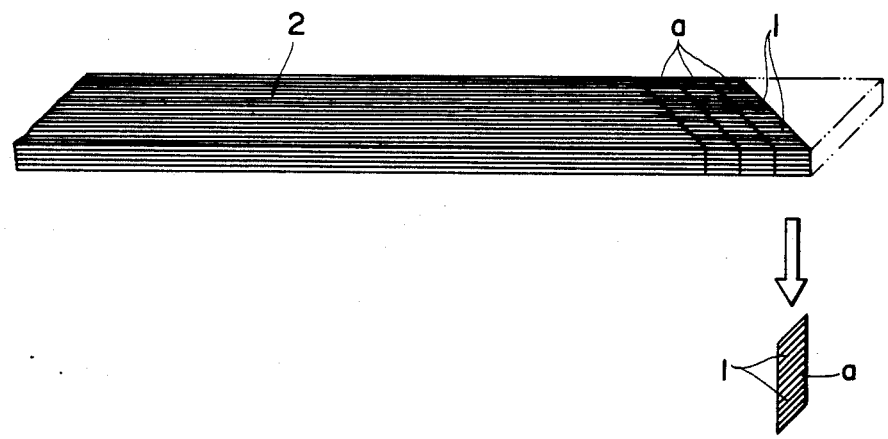
FIG. 6 is an explanatory view showing one example of the process for manufacturing the product of FIG. 5.
Figure 5:
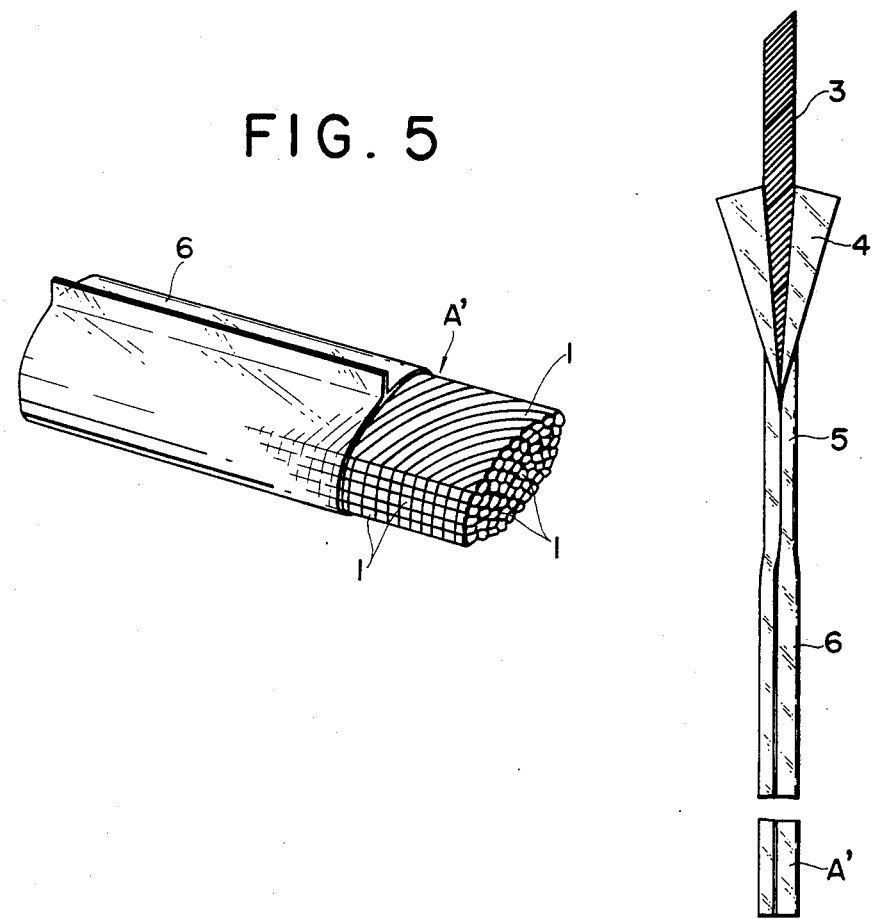
FIG. 5 is a perspective view of still another embodiment of a crab-meat-type boiled fish paste product according to the present invention.

Another embodiment of the present invention will be described with reference to FIGS. 5 and 6. FIG. 5 shows a product A' according to the present invention in which a number of short fibrous meats 1, 1 . . . are formed in a block but completely separable respectively and in which the fibrous meats is disposed diagonally at 45 degrees across the longitudinal direction of the product A'. Further, as seen from FIG. 5, the product A' is pressed and deformed at the corners thereof into a shape similar to that of crab claw meat.

The process for manufacturing the product A' will be described with reference to FIG. 6. As is the foregoing embodiment, a plurality of film-type-meats are respectively cut into the fibrous materials completely separable from the other along the longitudinal direction thereof by a conventional cutting means, and then laminated so as to form a grouped continuous long fibers 2. Subsequently, the grouped continuous long fibers 2 is cut off at an angle of 45 degrees across the moving direction of fibers by mean of a cutter, thereby to form a plurality of short fiber blocks a in which a number of short fibrous meats 1 are disposed at 45 degrees relative to the cutting face. Then, these short fiber blocks a, a, . . . are disposed to align in a line, the cutting faces of each block defining the lateral faces of the aligned long block, and then the short fiber blocks a thus aligned are bonded with each other so as to form a continuous long block 3. Further, the continuous block 3 is packed into a film 4 and the resultant packed continuous block 5 is then pressed in the substantially diagonal direction to form a pressed long block 6 which has a sectional shape similar to that of crab claw meat. Finally, a shown in FIG. 5, the pressed continuous block 6 is cut off into a plurality of crab-meat-type fish paste product A' with a desired length.

The product A' thus manufactured offers a feeling in the mouth very similar to actual crab meat even with fish pastes, as is the product A in FIG. 1 through FIG. 4. In addition, although the product A was obtained only by cutting the continuous block 3 and has a rectangular sectional shape not resembling to crab claw meat, the product A' is very close to crab claw meat also in appearance. More specifically, in the product A', the continuous block 3 is packed into a film and the resultant packed continuous block 5 is then pressed and deformed in the substantially diagonal direction. Thus, the angled corners of the product are rounded giving a sectional shape similar to an ellipsoid, i.e., that of actual crab claw meat.

Means for pressing the packed continuous block, includes a tapered roller rotatably supported above the conveyor surface or a widthwisely inclined conveyor in combination with a normal roller. In either case, the packed continuous block is passed between the roller and the conveyor. Although other pressing means are also available, it is the essential matter for the machine to press and deform the continuous block into an appearance, particularly into a sectional shape, similar to crab claw meat.

Although the present invention has been described above in connection with the preferred embodiments, the present invention will not be limited to the foregoing embodiments. In other words, there are various other methods for manufacturing the product of the present invention than the process as mentioned above, and the present invention will not be limited to the foregoing manufacturing process. For example, the short fibrous meats 1 were disposed at 45 degrees in the illustrated embodiment, but limitation is not imposed to this angle. The essential matter is that the disposed direction of fibers in the short fiber blocks is diagonal across the longitudinal direction of the finished product, and the disposed angle can be selected at any desired angle in a range up to 90 degrees at maximum.

Moreover, although the continuous block 3 was aligned to one line in the embodiment, it is possible to manufacture a combinated continuous block with plural lines side by side of different fiber directions, or a combinated continuous block with plural lines side by side of the same fiber direction. Also, when a plurality of the short fiber blocks are bonded with each other along the longitudinal direction, those interconnected parts may be bonded by means of adhesive pastes or the like, preventing the separation at the inter-faced parts in the case of products which are not packed.

Figure 4:
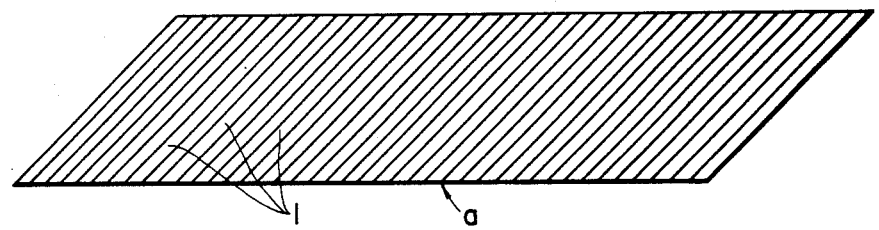
FIG. 4 is a sectional view of another embodiment of a crab-meat-type fish paste product according to the present invention.

Further, although the continuous block 3 was cut off at a predetermined length to obtain the product A or A', the short fiber block a may be also available as it is for a finished product without forming and cutting the long continuous block, even in the form of the short fiber block a, as seen from FIG. 4. Also, the continuous block 3 may be colored with the colors similar to that of crab meat and packed into films. Thus, it is possible to obtain the colored and packed products, by cutting the resultant continuous block. Similarly, the grouped continuous long fibers 2 may be colored and packed into films to obtain the colored and packed group products.

As explained above, according to the present invention, since the short fibrous meats are diagonally disposed across the longitudinal direction of the product and completely independent of one another, the resultant products are easily torn up upon biting along the natural direction of the product, namely, the disposed direction of fibers, and the meats are naturally separated one from the other along the short fibers without feeling to bite the meat and, when chewed in the mouth, the short fibrous meats easily come loose. As a result, according to the present invention, even with the fish paste product, high quality products can be obtained, having the pleasant touch on teeth and tongue very close to that of the genuine crab meat, and having an appearance and feeling in the mouth similar to those of crab meat.

Accordingly, it is to be noted that any products wherein a number of short fibrous meats in the short fiber block are disposed diagonally across the longitudinal direction of the block and the individual short fibrous meats are completely independent of one another fall within the scope of the present invention.

What is claimed is:

1. A fish product having the appearance and mouth feel resembling that of crab meat which comprises a plurality of short fish meat fibers diagonally disposed in a predetermined direction across the longitudinal direction of the finished product, said short fish meat fibers being completely separated from one another.

2. A fish product having the apearance and mouth feel resembling that of crab meat which comprises a plurality of short fish meat fibers disposed diagonally in a predetermined direction across the longitudinal direction of the finished product, wherein the product comprises a plurality of unit blocks different from one block to another block in the predetermined direction of the short fibers therein and wherein in each said unit block the individual short meat fibers are completely separated from one another.

3. A fish product having the appearance and mouth feel resembling that of crab meat which comprises a plurality of short fish meat fibers disposed diagonally in a predetermined direction across the longitudinal direction of the finished product, said individual short fish meat fibers being completely separated from one another, wherein the product comprises a unit block of short fish meat fibers pressed and deformed to have a predetermined appearance.

4. The fish product according to claim 1, 2 or 3, wherein the predetermined direction of said short fish meat fibers is diagonal across the longitudinal direction of said product up to a maximum angle of 90 degrees.

5. The fish product according to claim 1, 2 or 3, wherein said product is packed into a film and pressed and deformed to have a predetermined appearance.

6. The fish product according to claim 1, 2 or 3, wherein said product is colored to have a predetermined appearance.

* * * * *